(12) United States Patent
Rousseaux

(10) Patent No.: US 11,199,675 B2
(45) Date of Patent: Dec. 14, 2021

(54) INDEXING ARCHITECTURE INCLUDING AN OPTICAL FIBER CABLE FAN-OUT ARRANGEMENT

(71) Applicant: COMMSCOPE CONNECTIVITY BELGIUM BVBA, Kessel-Lo (BE)

(72) Inventor: Olivier Hubert Daniel Yves Rousseaux, Brussels (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/904,947

(22) Filed: Jun. 18, 2020

(65) Prior Publication Data

US 2020/0393631 A1 Dec. 17, 2020

Related U.S. Application Data

(63) Continuation of application No. 16/330,958, filed as application No. PCT/EP2017/072133 on Sep. 4, 2017, now Pat. No. 10,690,875.

(60) Provisional application No. 62/383,965, filed on Sep. 6, 2016.

(51) Int. Cl.
*G02B 6/38* (2006.01)
*G02B 6/44* (2006.01)

(52) U.S. Cl.
CPC ......... *G02B 6/4472* (2013.01); *G02B 6/3885* (2013.01); *G02B 6/4471* (2013.01)

(58) Field of Classification Search
CPC ... G02B 6/3885; G02B 6/4471; G02B 6/4472
See application file for complete search history.

(56) References Cited

U.S. PATENT DOCUMENTS

| | | | |
|---|---|---|---|
| 7,237,966 B2* | 7/2007 | Quinby | G02B 6/3851 385/100 |
| 7,689,079 B2* | 3/2010 | Burnham | G02B 6/4453 385/51 |
| 7,756,371 B1* | 7/2010 | Burnham | G02B 6/3897 385/51 |
| 8,009,959 B2* | 8/2011 | Barnes | G02B 6/3885 385/147 |
| 8,249,450 B2* | 8/2012 | Conner | G02B 6/4453 398/49 |
| 8,873,967 B2 | 10/2014 | Barnes et al. | |
| 8,961,035 B2 | 2/2015 | Leblanc | |

(Continued)

FOREIGN PATENT DOCUMENTS

| | | |
|---|---|---|
| DE | 203 21 316 U1 | 11/2006 |
| EP | 1 981 185 A1 | 10/2008 |

(Continued)

OTHER PUBLICATIONS

International Search Report and Written Opinion of the International Searching Authority for International Patent Application No. PCT/EP2017/072133 dated Dec. 22, 2017, 14 pages.

*Primary Examiner* — Ryan A Lepisto
(74) *Attorney, Agent, or Firm* — Merchant & Gould P.C.

(57) ABSTRACT

The present disclosure relates to indexing cables for use in building fiber optic networks using an indexing architecture. In certain examples, fan-out structures are used. Certain types of indexing cables have one or more branch cable sections at each end. Certain types of indexing cables have multiple interface cable sections at one or both ends.

23 Claims, 9 Drawing Sheets

(56) References Cited

U.S. PATENT DOCUMENTS

| | | | |
|---|---|---|---|
| 9,020,309 B2* | 4/2015 | Kolesar | G02B 6/4472 |
| | | | 385/24 |
| 9,097,873 B2* | 8/2015 | Conner | G02B 6/4471 |
| 9,207,421 B2 | 12/2015 | Conner | |
| 9,348,096 B2* | 5/2016 | Kmit | H04B 10/27 |
| 9,482,840 B2* | 11/2016 | Conner | G02B 6/4475 |
| 9,557,498 B2* | 1/2017 | Loeffelholz | G02B 6/3895 |
| 9,766,414 B2* | 9/2017 | Marcouiller | G02B 6/3879 |
| 9,829,651 B2* | 11/2017 | Hall | G02B 6/00 |
| 9,841,569 B2 | 12/2017 | Kmit et al. | |
| 9,851,525 B2* | 12/2017 | Loeffelholz | G02B 6/46 |
| 9,989,705 B2* | 6/2018 | Jensen | H04B 10/27 |
| 10,151,897 B2 | 12/2018 | Gronvall et al. | |
| 10,281,660 B2* | 5/2019 | Loeffelholz | G02B 6/3897 |
| 10,317,640 B2 | 6/2019 | Marcouiller | |
| 10,598,887 B2 | 3/2020 | Loeffelholz et al. | |
| 10,678,013 B2 | 6/2020 | Marcouiller | |
| 10,739,545 B2 | 8/2020 | Finnegan et al. | |
| 2008/0193091 A1 | 8/2008 | Herbst | |
| 2011/0293277 A1* | 12/2011 | Bradea | H04J 14/0282 |
| | | | 398/66 |
| 2013/0343700 A1 | 12/2013 | Kolesar | |
| 2014/0254986 A1 | 9/2014 | Kmit et al. | |
| 2018/0164514 A1 | 6/2018 | Kmit et al. | |
| 2019/0187393 A1 | 6/2019 | Gronvall et al. | |

FOREIGN PATENT DOCUMENTS

| | | |
|---|---|---|
| FR | 2 923 667 A1 | 5/2009 |
| JP | H10-32545 A | 2/1998 |
| WO | 2013/149150 A1 | 10/2013 |
| WO | 2014/190281 A1 | 11/2014 |
| WO | 2016/137934 A2 | 9/2016 |
| WO | 2018/034907 A1 | 2/2018 |

* cited by examiner

INDEXING ARCHITECTURE INCLUDING AN OPTICAL FIBER CABLE FAN-OUT ARRANGEMENT

CROSS-REFERENCE TO RELATED APPLICATION

This application is a continuation of U.S. patent application Ser. No. 16/330,958, filed on Mar. 6, 2019, now U.S. Pat. No. 10,690,875, which is a National Stage Application of PCT/EP2017/072133, filed on Sep. 4, 2017, which claims the benefit of U.S. Patent Application Ser. No. 62/383,965, filed on Sep. 6, 2016, the disclosures of which are incorporated herein by reference in their entireties. To the extent appropriate, a claim of priority is made to each of the above disclosed applications.

TECHNICAL FIELD

The present disclosure relates generally to equipment for fiber optic communications networks. More particularly, the present disclosure relates to fiber optic networks including indexing architectures and fan-outs.

BACKGROUND

Optical networks are becoming increasingly prevalent in part because service providers want to deliver high bandwidth communication capabilities to customers. As the demand for optical networks increases, there is a need to extend fiber optic networks closer to the edge (i.e., closer to subscriber locations). In this regard, there is a need for cost-effective architectures for extending fiber optic networks. One example of a cost-effective architecture is an indexing architecture. Example indexing architectures are disclosed by PCT Int'l Publication No. WO 2014/190281.

SUMMARY

Aspects of the present disclosure relate to an indexing cable extending between a first end and a second end. The indexing cable includes a plurality of optical fibers. The indexing cable also includes a first interface cable section disposed at the first end of the indexing cable; a first branch cable section disposed at the first end of the indexing cable; a second interface cable section disposed at the second end of the indexing cable; and a second branch cable section disposed at the second end of the indexing cable. The first branch cable section includes fewer of the optical fibers than the first interface cable section. The second branch cable section includes fewer of the optical fibers than the second interface cable section.

In certain implementations, the first interface cable is one of a plurality of first interface cables.

In certain implementations, the first branch cable is one of a plurality of first branch cables.

In accordance with some aspects of the disclosure an indexing component including a main cable section including a plurality of optical lines. The optical lines extend between first and second ends. The first ends of the optical lines are separated into a first branch set and a first interface set. The second ends of the optical lines are separated into a second branch set and a second interface set. The first branch set has fewer optical lines than the first interface set and the second branch set has fewer optical lines than the second interface set. The optical lines of the first branch set are different from the optical lines of the second branch set. The second interface set includes the optical lines of the first branch set. The first interface set includes the optical lines of the second branch set. A first interface multi-fiber connector has a plurality of sequential positions. The first interface multi-fiber connector terminates the first interface set so that the optical lines of the first interface set are indexed at the sequential fiber positions of the first interface multi-fiber connector. A second interface multi-fiber connector has a plurality of sequential positions. The second interface multi-fiber connector terminates the second interface set so that the optical lines of the second interface set are indexed at the sequential fiber positions of the second interface multi-fiber connector. A first branch multi-fiber connector terminates the first branch set. A second branch multi-fiber connector terminates the second branch set.

In certain implementations, the main cable section extends between a first end and a second end. The first interface set and the first branch set are separated from each other at a first fanout arrangement disposed at the first end of the main cable section. The second interface set and the second branch set are separated from each other at a second fanout arrangement disposed at the second end of the main cable section.

In certain implementations, the first interface set of optical lines form a first interface cable section that extends between the first interface multi-fiber connector and the first fanout arrangement. The second interface set of optical lines form a second interface cable section that extends between the second interface multi-fiber connector and the second fanout arrangement.

In certain implementations, at least one of the fanout arrangements includes a plurality of fanouts. In certain implementations, at least one of the fanout arrangements includes a single fanout.

In certain implementations, the first interface connector is one of a plurality of first interface connectors and the first interface cable section is one of a plurality of first interface cable sections extending from the first fanout arrangement to a respective one of the first interface connectors.

In some implementations, the first branch set of optical fibers includes a single optical fiber. In other implementations, the first branch set of optical fibers includes a plurality of optical fibers.

In certain examples, the first branch multi-fiber connector has a number of sequential positions, and the first branch set includes a number of the optical lines that is less than the number of sequential positions of the first branch multi-fiber connector.

In certain examples, a number of sequential positions of the first branch multi-fiber connector is less than the number of the sequential positions of the first interface multi-fiber connector.

In certain examples, the second branch multi-fiber connector has a number of sequential positions and the second branch set includes a number of the optical lines that is less than the number of sequential positions of the second branch multi-fiber connector.

In certain implementations, each optical line is formed by a single fiber.

In certain implementations, the first and second interface multi-fiber connectors are ruggedized.

In certain implementations, the first and second branch multi-fiber connectors are ruggedized.

In certain implementations, the main cable section has a sufficient number of optical lines to fill all of the sequential positions of the first interface connector and at least one sequential position of the first branch connector.

Other aspects of the present disclosure relate to an indexing cable. The indexing cable includes a main cable section extending between a first fanout and a second fanout. The main cable section includes optical fibers. A first interface cable section extends outwardly from the first fanout by a first interface length that is less than a length of the main cable section. The first interface cable section is terminated by a first interface multi-fiber connector defining a plurality of sequential positions. A second interface cable section extends outwardly from the second fanout by a second interface length that is less than the length of the main cable section. The second interface cable section is terminated by a second interface multi-fiber connector defining a plurality of sequential positions. A first branch cable section extends outwardly from the first fanout by a first branch length that is less than the length of the main cable section. The first branch cable section is terminated by a first branch connector. One of the optical fibers extends between the first branch connector and the second interface multi-fiber connector. A second branch cable section extends outwardly from the second fanout by a second branch length that is less than the length of the main cable section. The second branch cable section is terminated by a second branch connector. Another of the optical fibers extends between the second branch connector and the first interface multi-fiber connector.

In certain implementations, some of the optical fibers are indexed between the first and second interface multi-fiber connectors.

In certain implementations, the first branch connector is a multi-fiber connector.

In certain implementations, the first branch connector receives first ends of a plurality of the optical fibers.

In certain implementations, the first branch connector has a number of sequential fiber positions that equals a number of sequential fiber positions of the first interface multi-fiber connector.

In certain implementations, the first branch connector has a number of sequential fiber positions that is less than a number of sequential fiber positions of the first interface multi-fiber connector.

In certain implementations, the first interface cable section is one of a plurality of first interface cable sections extending outwardly from the first fanout. Each first interface cable section is terminated by a respective first interface multi-fiber connector defining a plurality of sequential positions. The second interface cable section is one of a plurality of second interface cable sections extending outwardly from the second fanout. Each second interface cable section is terminated by a respective second interface multi-fiber connector defining a plurality of sequential positions.

In certain examples, the first branch connector and the respective multi-fiber connectors of the first interface cable sections cooperate to define sequential first interface positions. The second branch connector and the respective multi-fiber connectors of the second interface cable sections cooperate to define sequential second interface positions. The optical fibers are indexed between the first interface positions and the second interface positions.

In certain examples, one of the first interface cable sections includes a different number of optical fibers than another of the first interface cable sections.

In certain implementations, the first branch cable section is one of a plurality of first branch cable sections extending outwardly from the first fanout. Each first branch cable section being terminated by a respective first branch connector. The second branch cable section is one of a plurality of second branch cable sections extending outwardly from the second fanout. Each second branch cable section is terminated by a respective second branch connector.

In certain examples, the first interface cable section is one of a plurality of first interface cable sections extending outwardly from the first fanout. Each first interface cable section is terminated by a respective first interface multi-fiber connector defining a plurality of sequential positions. The second interface cable section is one of a plurality of second interface cable sections extending outwardly from the second fanout. Each second interface cable section is terminated by a respective second interface multi-fiber connector defining a plurality of sequential positions.

In certain examples, the respective multi-fiber connectors of the first interface cable sections cooperate to define sequential first interface positions. The respective multi-fiber connectors of the second interface cable sections cooperate to define sequential second interface positions. The optical fibers are indexed between the first interface positions and the second interface positions.

In an example, one of the first interface cable sections includes a different number of optical fibers than another of the first interface cable sections.

In certain examples, one of the first branch cable sections includes a different number of optical fibers than another of the first branch cable sections.

A variety of additional aspects will be set forth in the description that follows. These aspects can relate to individual features and to combinations of features. It is to be understood that both the forgoing general description and the following detailed description are exemplary and explanatory only and are not restrictive of the broad concepts upon which the examples disclosed herein are based.

DETAILED DESCRIPTION

Reference will now be made in detail to exemplary aspects of the present disclosure that are illustrated in the accompanying drawings. Wherever possible, the same reference numbers will be used throughout the drawings to refer to the same or like structure.

Aspects of the present disclosure relate to components for supporting indexing architectures. In certain examples, the components can include indexing cables. In certain examples, the indexing architectures can include forward and reverse indexing. It will be appreciated that examples of forward and reverse indexing architectures and of systems where multiple indexing components are daisy-chained together are disclosed by PCT Int'l Publication No. WO 2014/190281, which is hereby incorporated by reference in its entirety.

Figure 1:
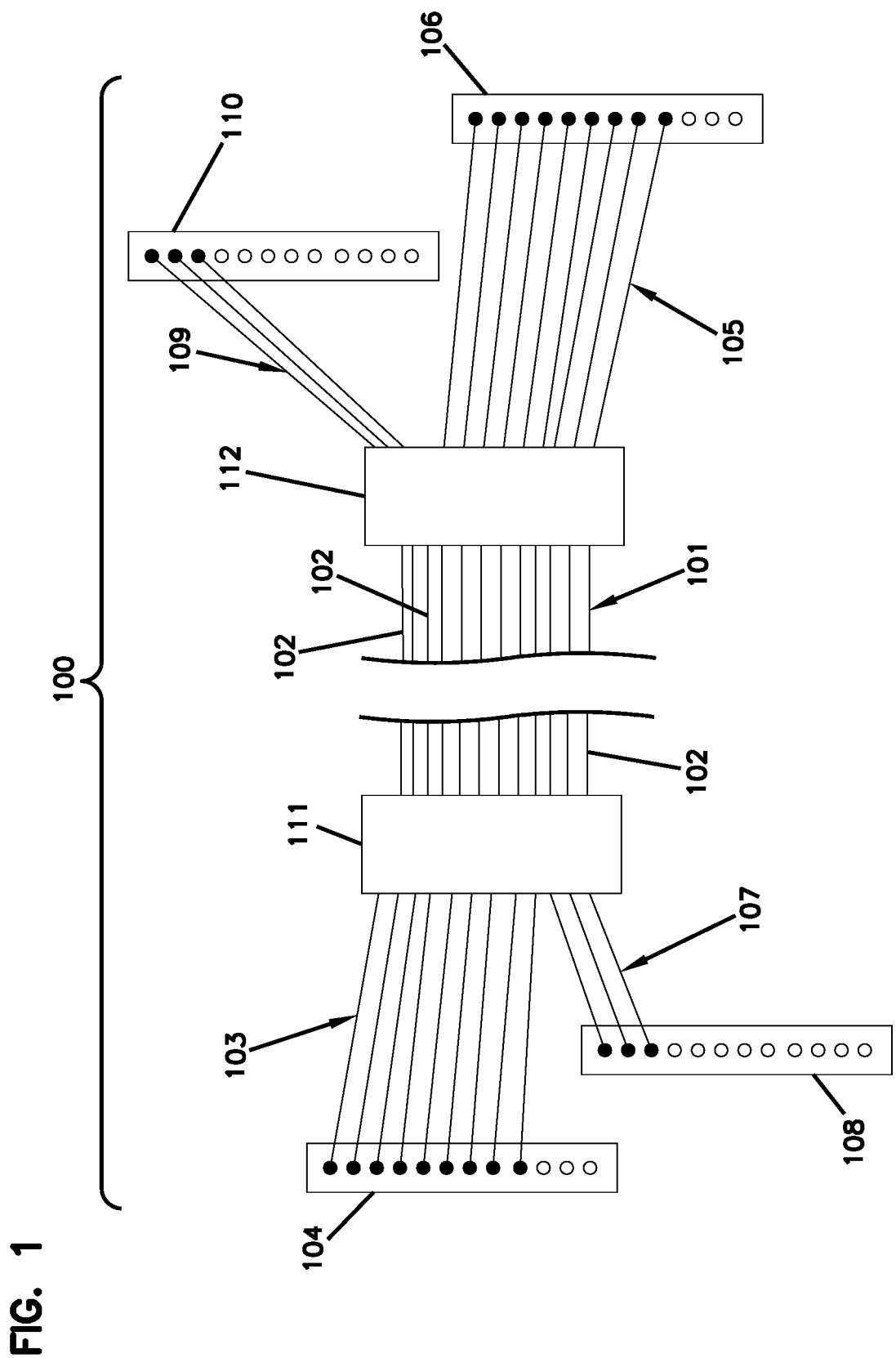
FIG. 1 is a schematic diagram of an indexing cable including an interface cable section and a branch cable section at a first end of the cable and an interface cable section and a branch cable section at a second end of the cable in accordance with the principles of the present disclosure.

FIG. 1 illustrates an indexing cable 100 terminated at opposite ends by interface connectors 104, 106 and branch connectors 108, 110. The indexing cable 100 includes a plurality of optical fibers 102 that extend along a main cable section 101. Multiple indexing cables can be daisy-chained together to form a fiber path (see FIG. 2). Fiber lines are progressively branched from locations along the fiber path. As the fiber lines are branched, the remaining fiber lines are progressively indexed along the chain in at least a first indexing direction $I_1$. In certain examples, the fibers also are progressively indexed along the chain in a second indexing direction $I_2$. Each fiber line includes one or more optical fibers optically coupled together to extend along the fiber path.

As shown in FIG. 1, one or more of the optical fibers 102 of each cable 100 branch out from the main cable section 101 at the first and second ends of the cable 100. At each end of the indexing cable 100, the branch fibers—called a branch set—are connectorized separately from the non-branch fibers—called an interface set.

Each of the interface connectors 104, 106 defines a plurality of sequential fiber positions for receiving fibers of the interface set. First ends of at least some fibers 102 of the indexing cable 100 disposed at the sequential fiber positions of the first interface connector 104. These fibers include fibers that do not branch and fibers that branch at the second end. The second end of a branch one of these fibers is terminated at a branch connector 110 at the second end of the cable 100. The second end of the first non-branch one of these fibers (i.e., the non-branch fiber having the first end sequentially closest to the first sequential position at the first interface connector 104) is indexed to the first sequential position at the second interface connector 106 at the second end of the cable 100.

Figure 2:
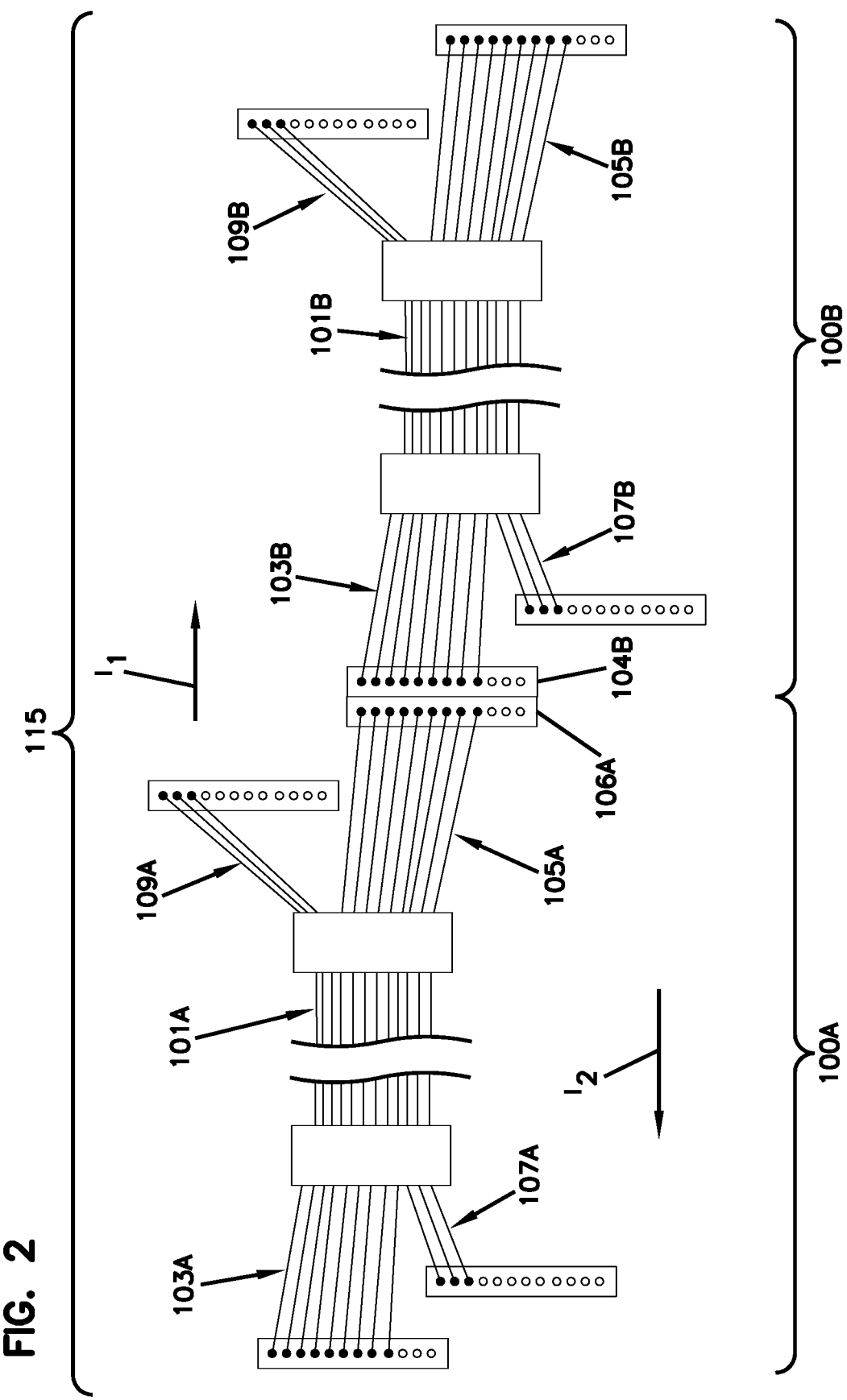
FIG. 2 shows the indexing cable of FIG. 1 daisy-chained to another such indexing cable in accordance with the principles of the present disclosure.

Indexing cables are daisy-chained together by optically coupling the second interface connector 106 of one cable 100A and the first interface connector 104 of another cable 100B (see FIG. 2). Fiber lines extend from the first interface connector 104 of the first cable 100A towards the second interface connector 108 of the last cable 100B. The indexing cables 100A, 100B along the fiber path will follow a predetermined schema so that each fiber line is branched when it reaches a predetermined sequential fiber position of one of the interface connectors 104, 106. Each branch fiber line can be routed from the branch location to a subscriber or elsewhere in the network (e.g., subsequent to the cable chaining).

In certain examples, one or more fibers 102 of a cable 100 can branch from the main cable section 101 at the first end of the cable 100 (see FIG. 1). The branch fibers at the first end of the cable 100 are connectorized separately from the non-branch fibers at the first end.

Second ends of some fibers 102 of the indexing cable 100 are disposed at the sequential fiber positions of the second interface connector 106. These fibers include fibers that do not branch and fibers that branch at the first end. The first end of a branch one of these fibers is terminated at a branch connector 108 at the first end of the cable 100. Typically, the second end of the branch one(s) of these fibers is/are terminated at the last active sequential position(s) at the second interface connector 106. In certain examples, the last active sequential fiber position need not be the last sequential fiber position of the connector. For example, if an interface connector 104, 106 has N sequential fiber positions, then the interface connector may receive N–x fibers wherein x is any integer between 0 and (N–1). In such an example, the last active sequential fiber position may be position N–x.

Referring still to FIG. 1, the example indexing cable 100 shown includes a main cable section 101 extending between a first fanout arrangement 111 and a second fanout arrangement 112. The main cable section 101 includes optical fibers 102. A first interface cable section 103 extends outwardly from the first fanout arrangement 111 by a first interface length that is less than a length of the main cable section 101. The first interface cable section 103 is terminated by the first interface connector 104. A second interface cable section 105 extends outwardly from the second fanout arrangement 112 by a second interface length that is less than the length of the main cable section 101. The second interface cable section 105 is terminated by the second interface connector 106.

As the term is used herein, a fanout arrangement 111, 112 refers to one or more fanouts that transitions the optical fibers from the main cable section 101 to one of the cable sections 103, 105, 107, 109. A fanout refers to a structure that separates or groups optical fibers. In some examples, a fanout can include a rigid body that holds the optical fibers. In other examples, the fanout can include a flexible body that encloses the optical fibers. In still other examples, the fanout can enclose spliced optical fibers. Examples of suitable fanouts are disclosed in U.S. Provisional Application No. 62/375,404, filed Aug. 15, 2016, and titled "Indexing Architecture Including a Fan-out Arrangement," the disclosure of which is hereby incorporated herein by reference.

In still other implementations, the cable 100 does not include fanout arrangements 111, 112. Rather, the fibers 102 of the main cable section 101 can be glued together while the fibers 102 of the interface cable sections and branch cable sections are not glued together. For example, the optical fibers 102 of the main cable section 101 can be ribbonized and split into two ribbonized groups without a structure disposed at the split.

Still referring to FIG. 1, a first branch cable section 107 extends outwardly from the first fanout arrangement 111 by a first branch length that is less than the length of the main cable section 101. The first branch cable section 107 is terminated by a first branch connector 108. One of the optical fibers 102 extends between the first branch connector 108 and the second interface multi-fiber connector 106.

A second branch cable section 109 extends outwardly from the second fanout arrangement 112 by a second branch length that is less than the length of the main cable section 101. The second branch cable section 109 is terminated by a second branch connector 110. Another of the optical fibers 102 extends between the second branch connector 110 and the first interface multi-fiber connector 104.

The first fanout arrangement 111 combines the optical fibers 102 of the first interface cable section 103 and the optical fibers 102 of the first branch cable section 107 onto the main cable section 101. The second fanout arrangement 112 combines the optical fibers 102 of the second interface cable section 105 and the optical fibers 102 of the second branch cable section 109 onto the main cable section 101.

The optical fibers 102 that extend along the first interface cable section 103 from the first interface multi-fiber connector 104 are routed through the first fanout arrangement 111, along the main cable 101, to the second fanout arrangement 112. These optical fibers 102 are separated at the second fanout arrangement 112 into branch fibers and non-branch fibers. The branch fibers are routed through the second branch cable section 109 and the non-branch fibers are routed through the second interface cable section 105. In particular, at least the optical fiber 102 that corresponds to a first sequential fiber position at the first interface multi-fiber connector 104 is routed to the second branch cable section 109. The interface fibers are indexed along the sequential fiber positions of the second interface multi-fiber connector 106.

The optical fibers 102 that extend along the second interface cable section 105 from the second interface multi-fiber connector 106 are routed through the second fanout arrangement 112, along the main cable 101, to the first fanout arrangement 111. These optical fibers 102 are separated at the first fanout 111 into branch fibers and non-branch fibers. The branch fibers are routed through the first branch cable section 107 and the non-branch fibers are routed through the first interface cable section 103. In particular, at least the optical fiber 102 that corresponds to a last active sequential fiber position at the second interface multi-fiber connector 106 is routed to the first branch cable section 107. The non-branch fibers are indexed along the sequential fiber positions of the first interface multi-fiber connector 104.

In certain implementations, the first branch connector 108 is a multi-fiber connector. In certain examples, the first and second branch connectors 108, 110 are multi-fiber connectors. In certain examples, the first and second branch connectors 108, 110 are hardened connectors. In certain examples, the first and second branch connectors 108, 110 are hardened multi-fiber connectors.

In some implementations, the first branch connector 108 has a number of sequential fiber positions that is equal to a number of sequential fiber positions of the first interface multi-fiber connector 104 (e.g., see FIG. 1). In other implementations, the first branch connector 108 has a number of sequential fiber positions that is less than a number of sequential fiber positions of the first interface multi-fiber connector 104 (e.g., see FIG. 3).

In certain implementations, the first branch connector 108 receives a plurality of the optical fibers 102. In certain implementations, the first branch connector 108 receives a fewer number of the optical fibers 102 than the first non-branch multi-fiber connector 104 (e.g., see FIG. 1).

In certain implementations, the second branch connector 110 receives a plurality of the optical fibers 102. In certain implementations, the second branch connector 110 receives a fewer number of the optical fibers 102 than the second interface multi-fiber connector 106. In certain examples, the second branch connector 110 receives a common number of optical fibers as the first branch connector 108.

As shown in FIG. 2, two or more indexing cables 100A, 100B can be daisy-chained together to from an extended indexing cable 115. The branch cable sections 103A, 109A, 103B, 109B allow optical equipment to be connected to various locations along the length of the extended indexing cable 115.

In certain implementations, the number of cables 100A, 100B that can be daisy-chained together is equal to the total number of optical fibers 102 of the main cable sections 101 divided by the greater of the number of optical fibers 102 branched at the first branch cable sections 107A, 107B or the number of optical fibers 102 branched at the second branch cable sections 109A, 109B. In certain examples, the number of fibers dropped at the first branch cable sections 107A, 107B is equal to the number of fibers dropped at the second branch cable sections 109A, 109B.

In the example shown, the first indexing cable 100A is identical to the second indexing cable 100B. In other examples, the indexing cables 100A have a common number of optical fibers at the interface multi-fiber connectors 104, 106.

A first interface multi-fiber connector 104B of the second cable 100B is connected to the second interface multi-fiber connector 106A of the first cable 100A. Because the optical fibers 102 are indexed between the first and second interface multi-fiber connectors 104, 106 of each cable 100, the active fiber positions of the second interface multi-fiber connector 106A match the active fiber positions of the first interface multi-fiber connector 104B.

Figure 3:
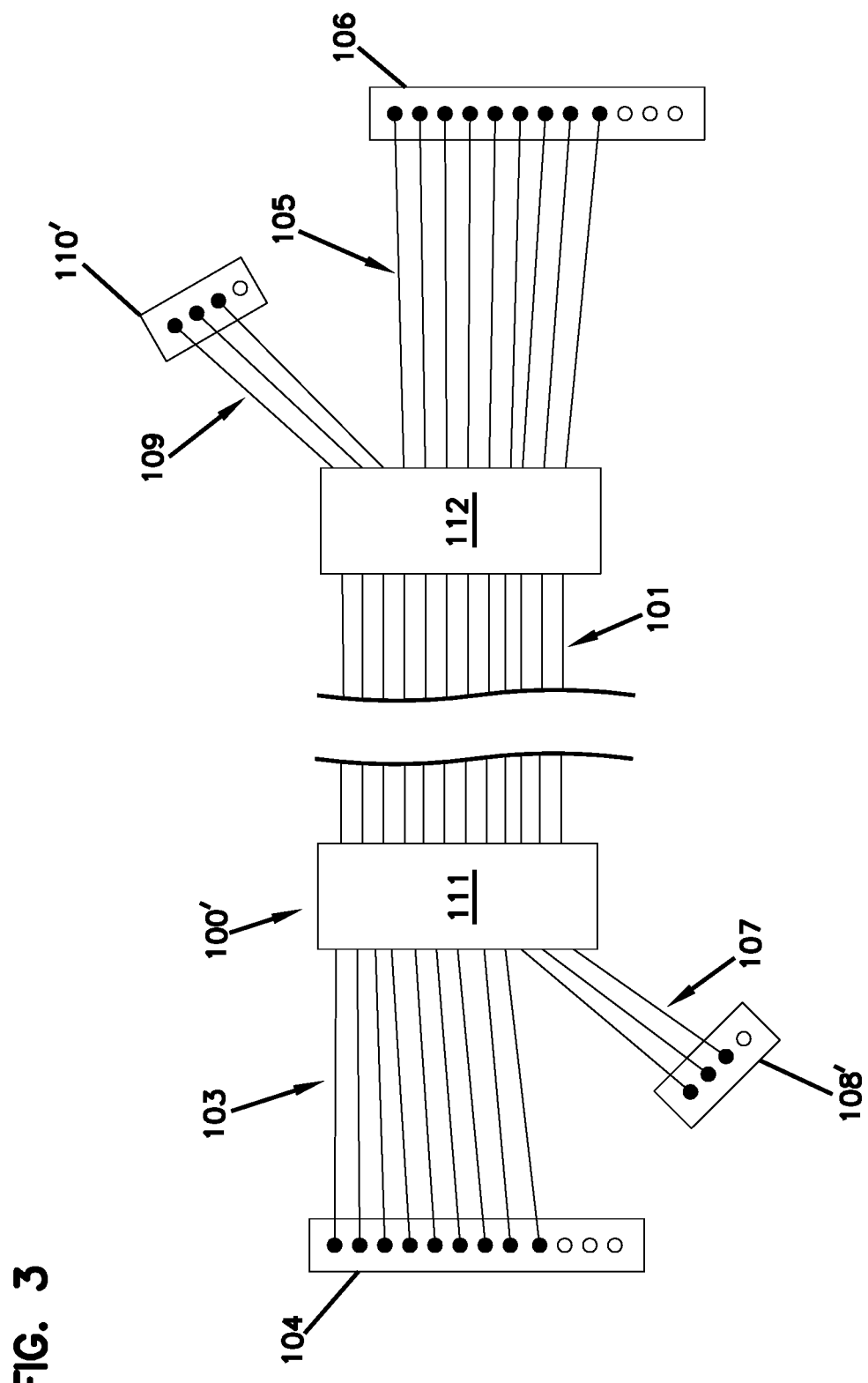
FIG. 3 is a schematic diagram of another indexing cable including branch connectors that have fewer fiber positions than the interface connectors.

As shown in FIG. 3, the branch connectors of an indexing cable can have a different number of sequential fiber positions than the interface multi-fiber connectors. For example, the indexing cable 100' shown in FIG. 3 has interface multi-fiber connectors 104, 106 with twelve sequential fiber positions each; the branch connectors 108', 110' of the indexing cable 100', however, have four sequential fiber positions each. In other examples, however, the interface multi-fiber connectors 104, 106 and the branch connectors 108', 110' can have any desired numbers of sequential fiber positions. Using connectors having fewer fiber positions for branch connectors 108', 110' as compared to interface connectors 104, 106 can reduce the cost of manufacturing the cable 100' and/or reduce the cost of manufacturing equipment to be connected to the cable 100'.

For each branch connector 108', 110' having N sequential fiber positions, the respective branch cable sections 107, 109 can include anywhere between 1 and N optical fibers 102. In the example shown in FIG. 3, the first branch cable section 107 includes three optical fibers 102 and the branch connector 108' includes four sequential fiber positions. In certain examples, if there are fewer optical fibers 102 in the branch cable section 107, 109 than sequential fiber positions at the corresponding branch connector 108', 110', then the optical fibers 102 of the branch cable section 107, 109 may be indexed at the sequential fiber positions of the branch connectors 108', 110'.

Figure 4A:
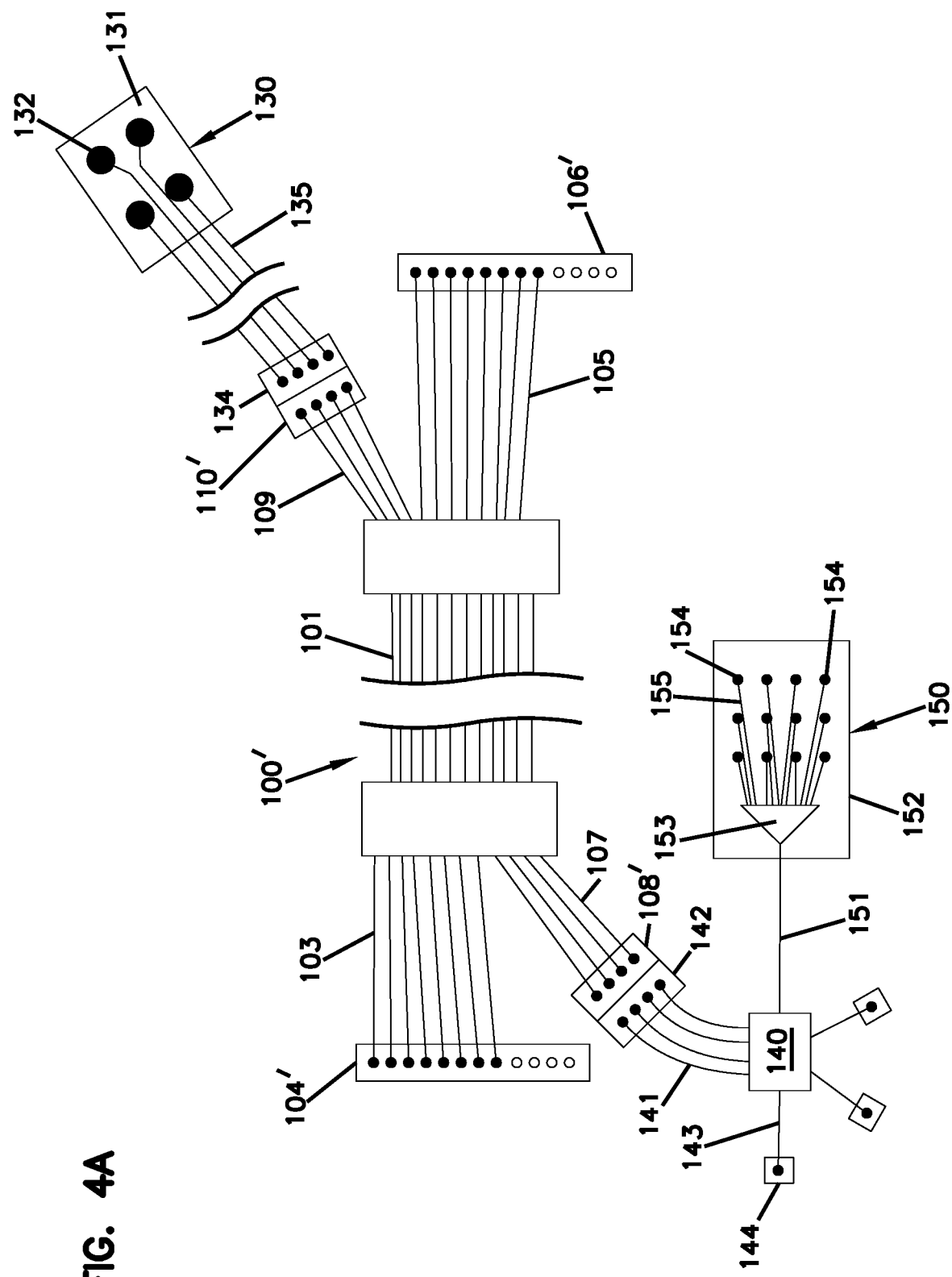
FIG. 4A is a schematic diagram showing optical equipment optically coupled to the branch cable sections of the indexing cable of FIG. 3.
Figure 4B:
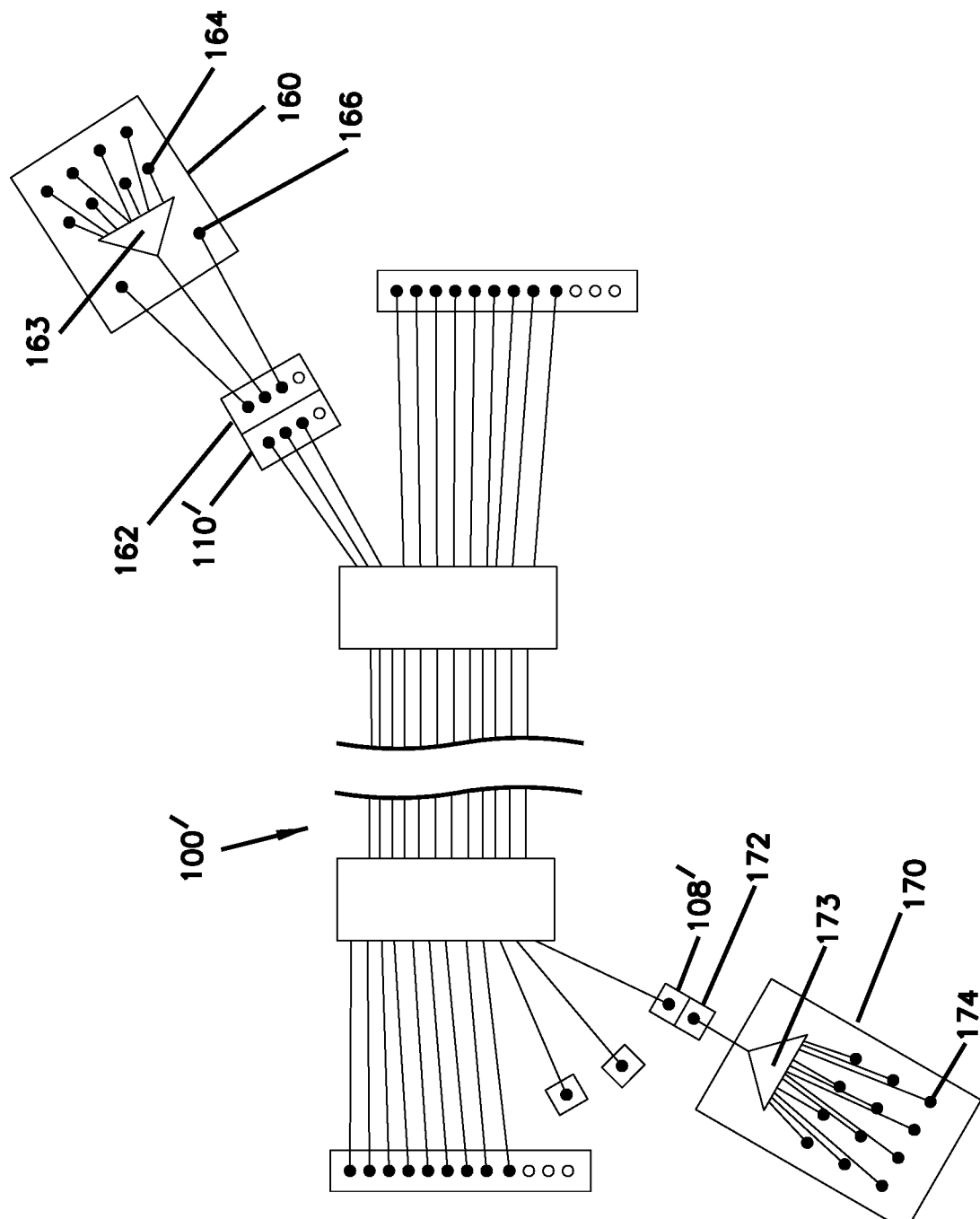
FIG. 4B is a schematic diagram showing other optical equipment optically coupled to the branch cable sections of the indexing cable of FIG. 3.

Referring now to FIGS. 4A and 4B, subscribers or optical equipment can be coupled to the optical network via the branch fibers of indexing cables 100, 100A, 100B, 100'. In some implementations, a distribution cable can be coupled to one or more branch fibers of the indexing cable 100, 100A, 100B, 100' to carry the optical signals of the branch fiber line from the indexing cables to the subscribers.

For example, FIG. 4A illustrates a piece of optical equipment 130 (e.g., a drop terminal, a splitter terminal, a multiplexing terminal, etc.) coupled to the second branch cable section 109 of the indexing cable 100'. In other implementations, the optical equipment 130 could be coupled to the branch cable section 107. In still other implementations, other types of optical equipment 140, 150, 160, 170 could be coupled to the branch cable section 109. In still yet other implementations, any of the pieces of optical equipment 130, 140, 150, 160, 170 can be coupled to any or all of the branch cable sections.

The optical equipment 130 includes a body 131 defining one or more output ports 132. Optical lines 135 optically couple the output ports 132 to one or more input connectors 134. Each input connector 134 is configured to be optically coupled to one of the branch connectors 108', 110' of the indexing cable 100'.

In some implementations, the optical equipment 130 includes a single input connector 134 terminating a stub cable that extends out from the body 131 (see FIG. 4A). In other implementations, the optical equipment 130 includes a single input connector 134 disposed on/in the body 131. In still other implementations, two or more input connectors 134 can terminate stub cables and/or be located on/in the body 131.

In some implementations, the output ports 132 of the optical equipment 130 are single-fiber output ports. In other implementations, the output ports 132 of the optical equipment 130 are multi-fiber output ports. In still other implementations, the output ports 132 of the optical equipment 130 are a mixture of single-fiber output ports and multi-fiber output ports.

In some implementations, each of the output ports 132 of the optical equipment 130 is optically coupled to one of the branch fibers in a point-to-point connection. In other words, the optical signals carried over the branch fiber are not split between the indexing cable 100, 100A, 100B, 100' and the output port 132. In other implementations, however, one or more output port 132 could receive split (e.g., power split, wavelength split, etc.) optical signals from the branch fibers.

For example, another type of optical equipment 150 is shown optically coupled to the first branch cable section 107. In other implementations, the optical equipment 150 could be coupled to the branch cable section 109. In still other implementations, other types of optical equipment 130, 160, 170 could be coupled to the branch cable section 107.

The optical equipment 150 includes a housing 152 that has more output lines than input lines. For example, the housing 152 can hold a splitter 153 (e.g., power splitter, wave division multiplexer, or other optical equipment to split an optical signal). In certain examples, connectorized pigtails extend from the splitter 153 to interior ports of the outputs 154. In the example shown, the optical equipment 150 includes a single input fiber 151 that feeds the splitter 153. In other examples, the splitter 153 may receive multiple inputs. In some examples, the input fiber 151 is a connectorized stub cable extending from the housing 152. In other examples, the input fiber 151 is a separate cable. In an example, the separate cable is connectorized at both ends.

In certain implementations, a fanout structure 140 can be optically coupled to one or more of the branch cable sections 107, 109 of the indexing cable 100. The fanout structure 140 is configured to transition a grouping of branch fiber lines to separate fiber lines. For example, FIG. 4A shows an example fanout structure 140 having a multi-fiber connector 142 that mates with the branch connector 108, 110 of the indexing cable. In some examples, the multi-fiber connector 142 is carried by the housing 140. In other examples, the multi-fiber connector 142 terminates a multi-fiber stub cable 141.

Within the fanout structure 140, optical fibers are routed from the multi-fiber connector 142 to different outputs. For example, in some implementations, pigtails 143 may extend from the fanout structure 140 and terminate at single-fiber connectors 144. In other implementations, the outputs may include ports disposed at the fanout structure 140.

For example, in FIG. 4A, a fanout structure 140 is optically coupled to the first branch cable section 107 at which four optical lines are branched. The fanout structure separates the four optical lines into four outputs. In other examples, however, the fanout structure 140 can separate the optical fibers into multiple multi-fiber outputs (e.g., duplex fiber outputs). In the example shown, three of the outputs 143 are single fibers terminated by single-fiber connectors 144 ready to be connected to subscribers or other equipment. The fourth output optically couples to the input 151 of the splitter terminal 150.

In FIG. 4B, other types of optical equipment 160, 170 are shown coupled to the branch cable sections 107, 109. For example, a terminal 160 can include a multi-fiber input 162 (e.g., connectorized stub, connectorized port, gland for multi-fiber cable, etc.). One or more of the input fibers can be routed to a splitter 163 (e.g., a power splitter, a wave division multiplexer, etc.), from which the signals are carried to multiple output ports 164. One or more other input fibers can be routed directly to output ports 166 to provide a point-to-point connection at the terminal 160. Accordingly, the same terminal 160 can provide connections for both split signals and unsplit signals.

Another example terminal 170 also is shown in FIG. 4B. The example terminal 170, which is shown coupled to the branch cable section 107, includes a single-fiber input 172. The single-fiber input 172 may feed a splitter (e.g., a power splitter, a wave division multiplexer, etc.) from which the signals are carried to multiple outputs 174. In certain examples, each of the branch fibers 107 can be coupled to a different terminal 170. In other examples, however, any optical equipment can be coupled to the branch fibers 107.

Figure 5:
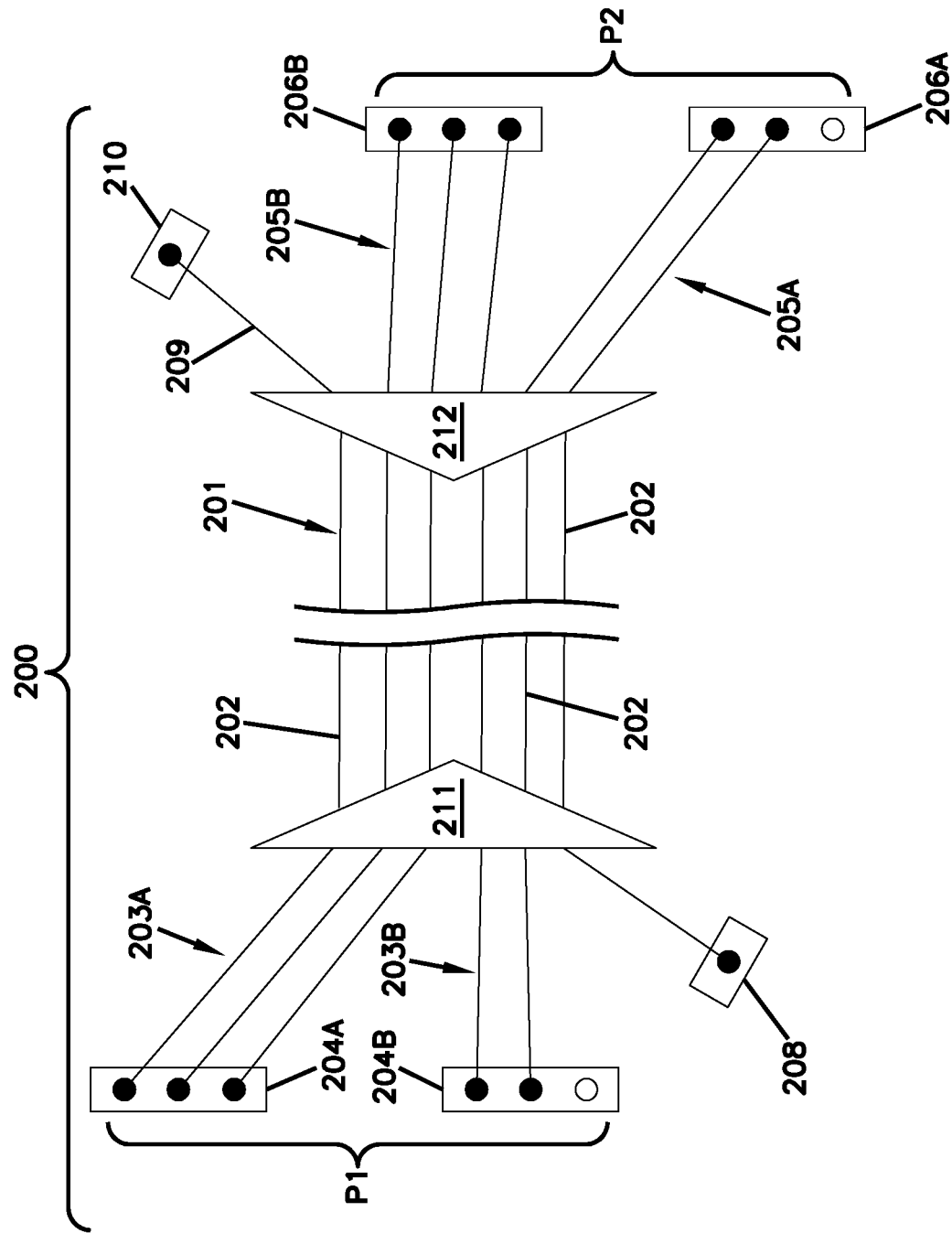
FIG. 5 is a schematic diagram of an example indexing cable having multiple interface cable sections.

Referring to FIG. 5, certain types of indexing cables 200 include multiple interface cable sections 203A, 203B, 205A, 205B extending outwardly from at least one of the fanout arrangements 211, 212. Each interface cable section 203A, 203B, 205A, 205B is terminated by a respective interface multi-fiber connector 204A, 204B, 206A, 206B defining a plurality of sequential positions.

In some implementations, the number of first interface cable sections 203A, 203B is equal to the number of second interface cable sections 205A, 205B. In other implementations, the total number of fibers 202 of first interface cable sections is equal to the total number of fibers 202 of the second interface cable sections while the number of first interface cable sections is different than the number of second interface cable sections. In an example, an indexing cable may have a single first interface cable section and multiple second interface cable sections. In another example, an indexing cable may have multiple first interface cable section and a single second interface cable sections. In another example, an indexing cable may have two (or any desired number) first interface cable section and three (or any desired number) second interface cable sections.

The respective multi-fiber connectors 204A, 204B of the first interface cable sections 203A, 203B cooperate to define a total number of sequential first interface positions P1. If at least one of the fibers 202 drops from the cable 200 at the first end of the cable 200, then the total number of fibers 202 received at the first interface cable sections 203A, 203B is less than the total number of sequential first interface positions P1. The respective multi-fiber connectors 206A, 206B of the second interface cable sections 205A, 205B cooperate to define a total number of sequential second interface positions P2. If at least one of the fibers 202 drops from the cable 200 at the first end of the cable 200, then the total number of fibers 202 received at the second interface cable sections 205A, 205B is less than the total number of sequential second interface positions P2.

In some implementations, when the optical fibers 202 are indexed at the first interface multi-fiber connectors 204A, 204B, the optical fibers 202 are along the total number of sequential first interface positions P1. Accordingly, depending on the number of optical fibers 202 being dropped at the branch cable section 207 and the number of fiber positions at each first interface multi-fiber connector 204A, 204B, one (or more) of the first interface multi-fiber connectors 204A receives optical fibers 202 at all of the sequential fiber positions of the first interface multi-fiber connector 204A and one (or more) of the first interface multi-fiber connectors 204B receives fewer optical fibers 202 than it has sequential fiber positions. In other implementations, the fibers 202 can be separately indexed at each first interface multi-fiber connector 204A, 204B so that each first interface multi-fiber connector 204A, 204B receives fewer fibers 202 than it has sequential fiber positions.

In some implementations, when the optical fibers 202 are indexed at the second interface multi-fiber connectors 206A, 206B, the optical fibers 202 are indexed along the total number of sequential second interface positions P2. Accordingly, depending on the number of optical fibers 202 being dropped at the branch cable section 209 and the number of fiber positions at each second interface multi-fiber connector 206A, 206B, one (or more) of the second interface multi-fiber connectors 206A receives optical fibers 202 at all of the sequential fiber positions of the second interface multi-fiber connector 204A and one (or more) of the first interface multi-fiber connectors 204B receives fewer optical fibers 202 than it has sequential fiber positions. In other implementations, the fibers 202 can be separately indexed at each second interface multi-fiber connector 206A, 206B so that each second interface multi-fiber connector 206A, 206B receives fewer fibers 202 than it has sequential fiber positions.

Figure 6:
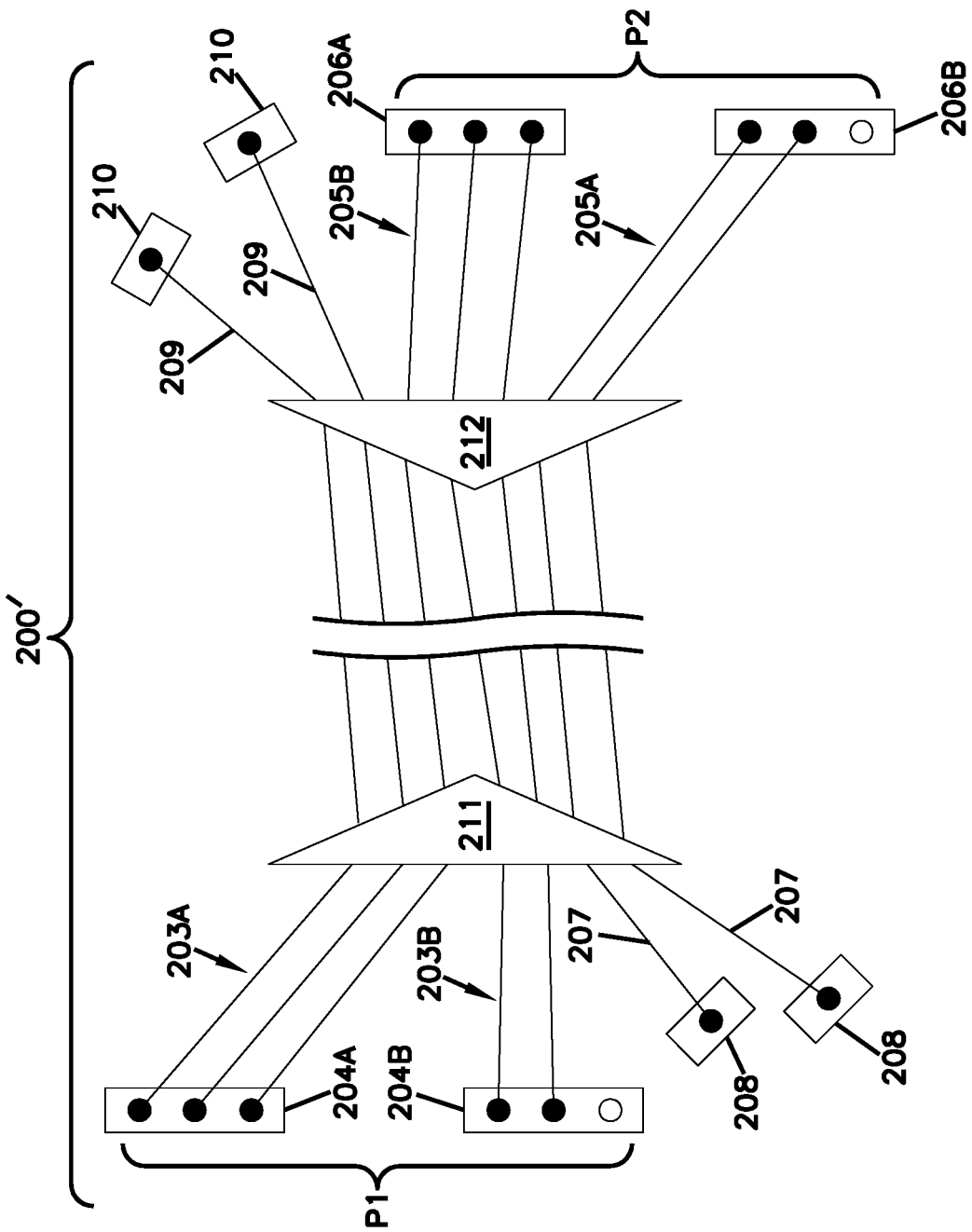
FIG. 6 is a schematic diagram of an example indexing cable having multiple branch cable sections.

Referring to FIG. 6, certain types of indexing cables 200' include multiple branch cable sections 207A, 207B, 209A, 209B extending outwardly from at least one of the fanouts 211, 212. Each branch cable section 207A, 207B, 209A, 209B is terminated by a respective branch connector 208A, 208B, 210A, 210B. Each branch connector 208A, 208B, 210A, 210B can be either a single fiber connector or a multiple fiber connector. Each branch cable section 207A, 207B, 209A, 209B can include one or more optical fibers 202. In certain examples, one branch cable section 207A, 207B, 209A, 209B has a different number of cables than another branch cable section 207A, 207B, 209A, 209B.

In some implementations, the number of first branch cable sections 207A, 207B extending outwardly from the first fanout 211 is equal to the number of second branch cable sections 209A, 209B extending outwardly from the second fanout 212. In other implementations, however, a total number of fibers 202 included in the first branch cable sections 207A, 207B is equal to the total number of fibers 202 included in the second branch cable sections 209A, 209B while the number of first branch cable sections 207A, 207B is different from the number of second branch cable sections 209A, 209B.

In certain implementations, the indexing cable 200' that includes multiple branch cable sections 207A, 207B, 209A, 209B also includes multiple interface cable sections 203A, 203B, 205A, 205B as shown in FIG. 5.

In still other implementations, as noted above, one or more of the cables 200, 200' does not include fanouts 211, 212. Rather, the optical fibers 202 of the main cable section 201 are separated at locations that are not enclosed. Rather, in certain types of cables 200, 200', the fibers 202 of the main cable section 201 can be glued together while the fibers 202 of the interface cable sections and branch cable sections are not glued together.

Figure 7:
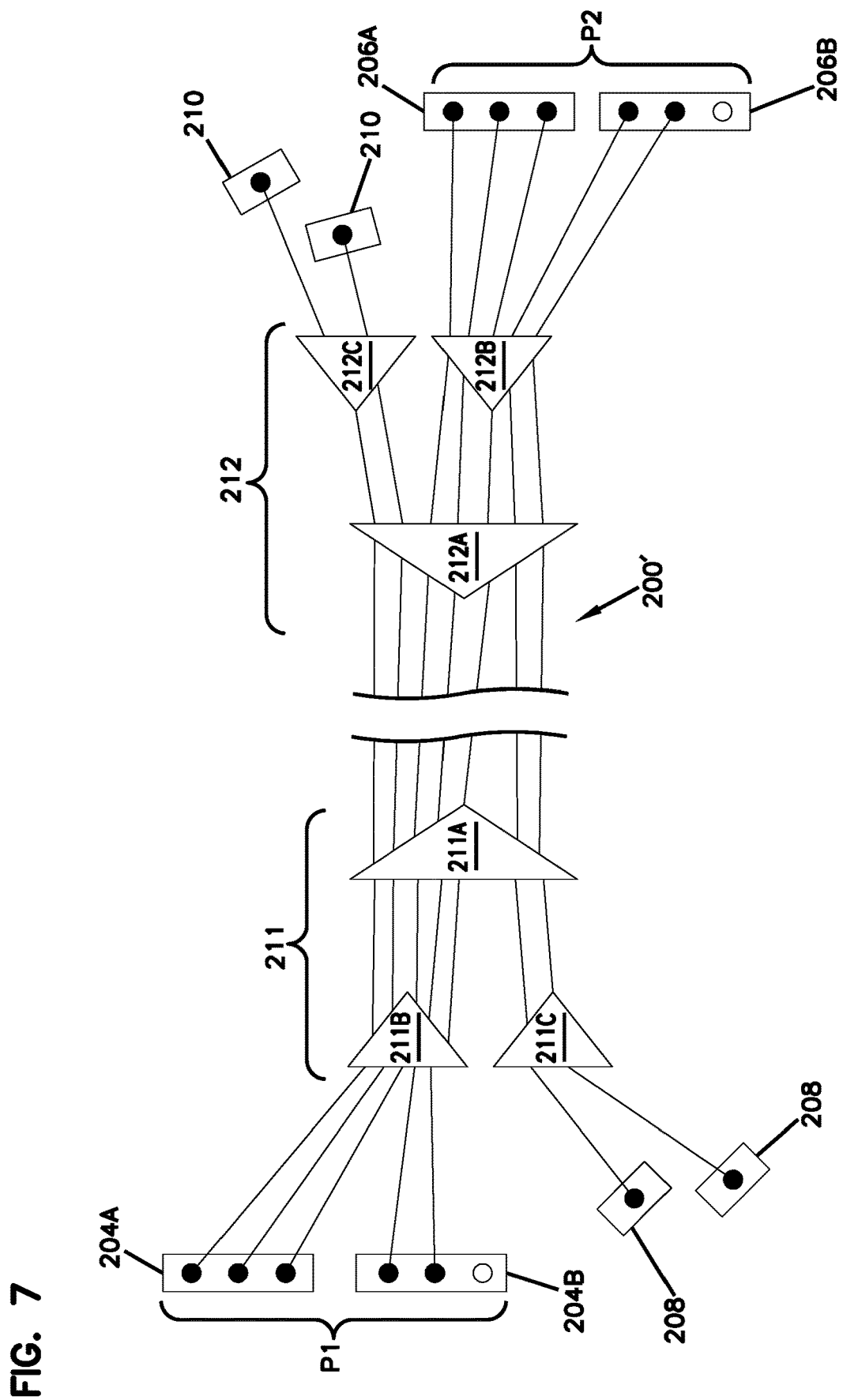
FIG. 7 is a schematic diagram of an example indexing cable having multiple fanouts at each fanout arrangement.

As shown in FIG. 7, certain types of fanout arrangements 211, 212 include two or more fanouts. For example, each fanout arrangement 211, 212 of the cable 200' can include a first fanout 211A, 212A that separates the main cable section 201 into a branch set and an interface set. In implementations where the interface fibers are terminated at different connectors 204A, 204B, 206A, 206B, a second fanout 211B, 212B is disposed between the respective first fanout 211A, 212A and the respective interface connectors 204A, 204B, 206A, 206B to separate the interface fibers into interface cable sections 203A, 203B, 205A, 205B. In implementations where the branch fibers are terminated at different branch connectors, a third fanout 211C, 212C is disposed between the respective first fanout 211A, 212A and the respective branch connectors 208A, 208B, 210A, 210B to separate the branch fibers into branch cable sections 207A, 207B, 209A, 209B.

In some implementations, additional fanouts can be provided to further separate out the interface fibers and/or the branch fibers. In other implementations, one or more of the fanouts can separate the fibers into three or more sets. For example, in certain examples, a single fanout 211, 212 can be provided at each side of the main cable section 201 to separate out the interface fibers and branch fibers into any desired number of cable sections.

Figure 8:
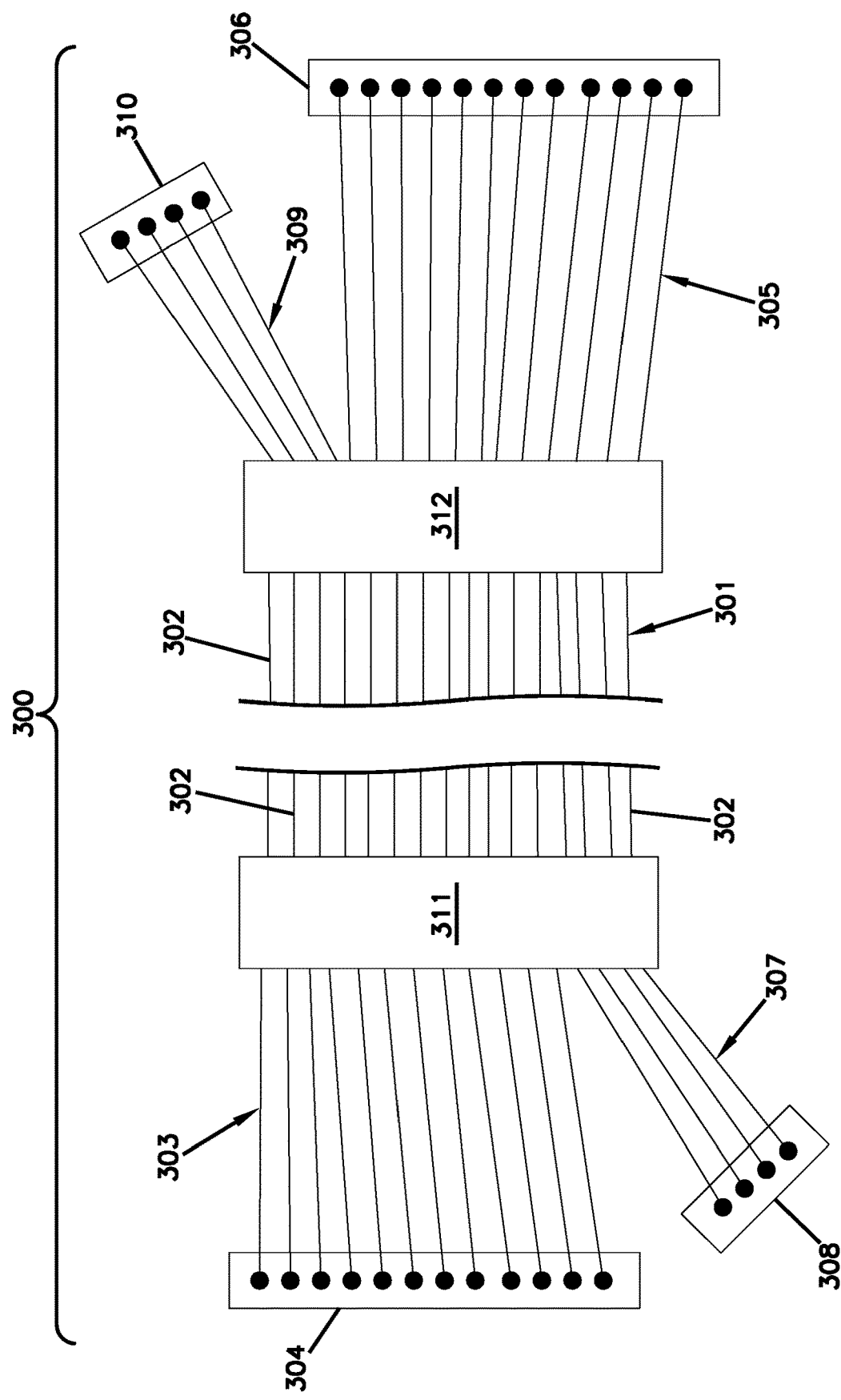
FIG. 8 is a schematic diagram of an example indexing cable configured to enable signals to be input onto the indexing cable through both a first interface connector and a first branch connector.

FIG. 8 illustrates another example indexing cable 300 including a main cable section 301 of multiple optical fibers 302. The first end of the indexing cable 300 includes a first interface cable section 303 terminated by a first multi-fiber interface connector 304 and the second end of the indexing cable 300 includes a second interface cable section 305 terminated by a second multi-fiber interface connector 306. The first end of the indexing cable 300 also includes a first branch cable section 307 terminated at a first branch connector 308. The second end of the indexing cable 300 includes a second branch cable section 309 terminated at a second branch connector 310.

In the example shown, the first interface cable section 303 and the first branch cable section 307 are separated from the main cable section 301 at a first fanout arrangement 311; the second interface cable section 305 and the second branch cable section 309 are separated from the main cable section 301 at a second fanout arrangement 312. As shown in FIG. 7, each fanout arrangement 311, 312 can include one or more fanouts. In other examples, however, the interface cable sections and/or branch cable sections can be otherwise coupled (e.g., spliced) to the main cable section 301.

In accordance with some aspects of the disclosure, the indexing cable has sufficient optical fibers to fill all sequential fiber positions of the first interface connector and at least one sequential fiber position of the first branch connector. In the example shown, the indexing cable 300 has sufficient optical fibers to fill all sequential fiber positions of the first interface connector 304 and all sequential fiber positions of the first branch connector 308. When the indexing cable 300 includes more optical fibers than sequential positions at (all of) the interface connector(s) 304, then the first branch connector 308 may function as an additional input for the indexing cable 300.

The indexing cable 300 branches off a first number of optical fibers at the second end of the cable. In certain implementations, the number of optical fibers 302 of the main cable section 301 over the total number of sequential positions of (all of) the first interface connector(s) 304 is no more than the first number of optical fibers that branch at the second end of the cable 300. Accordingly, when two or more indexing cables 300 are chained together, a sufficient number of optical fibers branch at the second end of the first cable 300 to allow the second interface connector 306 to receive the second ends of the optical fibers extending from the first branch connector 304. Such an implementation—using the first branch cable section 307 as an input—extends the number of cables that can be chained together by one.

In certain implementations, the second branch cable section 309 of the last cable in the chain also can be utilized as an input for the cable. The signals provided to the second branch connector 310 of the last cable 300 are carried over fibers having first ends indexed at the first interface connector 304 of the last cable 300 and thereby transitioned to the second-to-last cable in the chain.

Various modifications and alterations of this disclosure will become apparent to those skilled in the art without departing from the scope and spirit of this disclosure, and it should be understood that the scope of this disclosure is not to be unduly limited to the illustrated examples set forth herein.

What is claimed is:

1. An indexing cable arrangement comprising:
   a plurality of optical fibers extending between opposite first ends and second ends;
   a plurality of first multi-fiber connectors terminating the first ends of at least some of the optical fibers, the first multi-fiber connectors cooperating to define a total number of sequential first interface positions, wherein a total number of the at least some of the optical fibers received at the first multi-fiber connectors is less than the total number of sequential first interface positions;
   a drop connector coupled to the first end of at least one of the optical fibers, wherein the at least one of the optical fibers is a drop fiber; and
   a second multi-fiber connector terminating the second ends of multiple ones of the optical fibers, the multiple ones of the optical fibers being indexed between the second multi-fiber connector and the first multi-fiber connectors, wherein the second multi-fiber connector is one of a plurality of second multi-fiber connectors, the second multi-fiber connectors cooperating to define a total number of sequential second interface positions, wherein the total number of sequential second interface positions is greater than a total number of the second ends of the optical fibers terminated at the second multi-fiber connectors.

2. The indexing cable arrangement of claim 1, wherein the drop connector is a single-fiber connector.

3. The indexing cable arrangement of claim 1, wherein the drop connector is a multi-fiber connector.

4. The indexing cable arrangement of claim 3, wherein the multi-fiber drop connector defines fewer sequential fiber positions than any of the first multi-fiber connectors.

5. The indexing cable arrangement of claim 1, wherein each of the first multi-fiber connectors defines a common number of the sequential first interface positions.

6. The indexing cable arrangement of claim 1, further comprising a first fanout enclosing a location at which the optical fibers are separated towards the first multi-fiber connectors.

7. The indexing cable arrangement of claim 6, further comprising a second fanout enclosing a location at which the optical fibers are separated into interface fibers and the drop fiber, the interface fibers being directed to the first fanout, and the drop fiber being directed towards the first drop connector.

8. The indexing cable arrangement of claim 1, wherein the optical fibers are separated towards the first multi-fiber connectors at locations that are not enclosed.

9. The indexing cable arrangement of claim 1, wherein the first drop connector is one of a plurality of first drop connectors that each terminate the first end of a respective at least one of the optical fibers.

10. The indexing cable arrangement of claim 1, further comprising a second drop connector coupled to the second end of at least one of the optical fibers.

11. The indexing cable arrangement of claim 10, wherein the second drop connector is a single-fiber connector.

12. The indexing cable arrangement of claim 10, wherein the second drop connector is a multi-fiber connector.

13. The indexing cable arrangement of claim 10, wherein the second drop connector is one of a plurality of second drop connectors that each terminate the second end of a respective at least one of the optical fibers.

14. The indexing cable arrangement of claim 1, wherein each of the first multi-fiber connectors defines twelve of the sequential first interface positions.

15. The indexing cable arrangement of claim 1, further comprising a terminal coupled to the drop connector, the terminal including a body defining a plurality of output ports.

16. The indexing cable arrangement of claim 15, wherein the terminal includes a single input connector disposed at an end of a stub cable extending from the terminal.

17. The indexing cable arrangement of claim 15, wherein the terminal houses an optical splitter that outputs signals to at least some of the output ports of the terminal.

18. The indexing cable arrangement of claim 17, wherein the terminal also defines a point-to-point connection.

19. An indexing cable arrangement comprising:
    a plurality of optical fibers extending between opposite first ends and second ends;
    a plurality of first multi-fiber connectors terminating the first ends of at least some of the optical fibers, the first multi-fiber connectors cooperating to define a total number of sequential first interface positions, wherein a total number of the at least some of the optical fibers received at the first multi-fiber connectors is less than the total number of sequential first interface positions;
    a drop connector coupled to the first end of at least one of the optical fibers, wherein the at least one of the optical fibers is a drop fiber, the drop connector being a multi-fiber connector, wherein the multi-fiber drop connector defines fewer sequential fiber positions than any of the first multi-fiber connectors.; and
    a second multi-fiber connector terminating the second ends of multiple ones of the optical fibers, the multiple ones of the optical fibers being indexed between the second multi-fiber connector and the first multi-fiber connectors.

20. An indexing cable arrangement comprising:
    a plurality of optical fibers extending between opposite first ends and second ends;
    a plurality of first multi-fiber connectors terminating the first ends of at least some of the optical fibers, the first multi-fiber connectors cooperating to define a total number of sequential first interface positions, wherein a total number of the at least some of the optical fibers received at the first multi-fiber connectors is less than the total number of sequential first interface positions;

a drop connector coupled to the first end of at least one of the optical fibers, wherein the at least one of the optical fibers is a drop fiber;

a second multi-fiber connector terminating the second ends of multiple ones of the optical fibers, the multiple ones of the optical fibers being indexed between the second multi-fiber connector and the first multi-fiber connectors;

a first fanout enclosing a location at which the optical fibers are separated towards the first multi-fiber connectors; and a second fanout enclosing a location at which the optical fibers are separated into interface fibers and the drop fiber, the interface fibers being directed to the first fanout, and the drop fiber being directed towards the first drop connector.

21. An indexing cable arrangement comprising:

a plurality of optical fibers extending between opposite first ends and second ends;

a plurality of first multi-fiber connectors terminating the first ends of at least some of the optical fibers, the first multi-fiber connectors cooperating to define a total number of sequential first interface positions, wherein a total number of the at least some of the optical fibers received at the first multi-fiber connectors is less than the total number of sequential first interface positions;

a drop connector coupled to the first end of at least one of the optical fibers, wherein the at least one of the optical fibers is a drop fiber; and a second multi-fiber connector terminating the second ends of multiple ones of the optical fibers, the multiple ones of the optical fibers being indexed between the second multi-fiber connector and the first multi-fiber connectors;

a terminal coupled to the drop connector, the terminal including a body defining a plurality of output ports, wherein the terminal includes a single input connector disposed at an end of a stub cable extending from the terminal.

22. An indexing cable arrangement comprising:

a plurality of optical fibers extending between opposite first ends and second ends;

a plurality of first multi-fiber connectors terminating the first ends of at least some of the optical fibers, the first multi-fiber connectors cooperating to define a total number of sequential first interface positions, wherein a total number of the at least some of the optical fibers received at the first multi-fiber connectors is less than the total number of sequential first interface positions;

a drop connector coupled to the first end of at least one of the optical fibers, wherein the at least one of the optical fibers is a drop fiber; and a second multi-fiber connector terminating the second ends of multiple ones of the optical fibers, the multiple ones of the optical fibers being indexed between the second multi-fiber connector and the first multi-fiber connectors;

a terminal coupled to the drop connector, the terminal including a body defining a plurality of output ports, wherein the terminal houses an optical splitter that outputs signals to at least some of the output ports of the terminal.

23. The indexing cable arrangement of claim 22, wherein the terminal also defines a point-to-point connection.

\* \* \* \* \*